Patented Sept. 11, 1928.

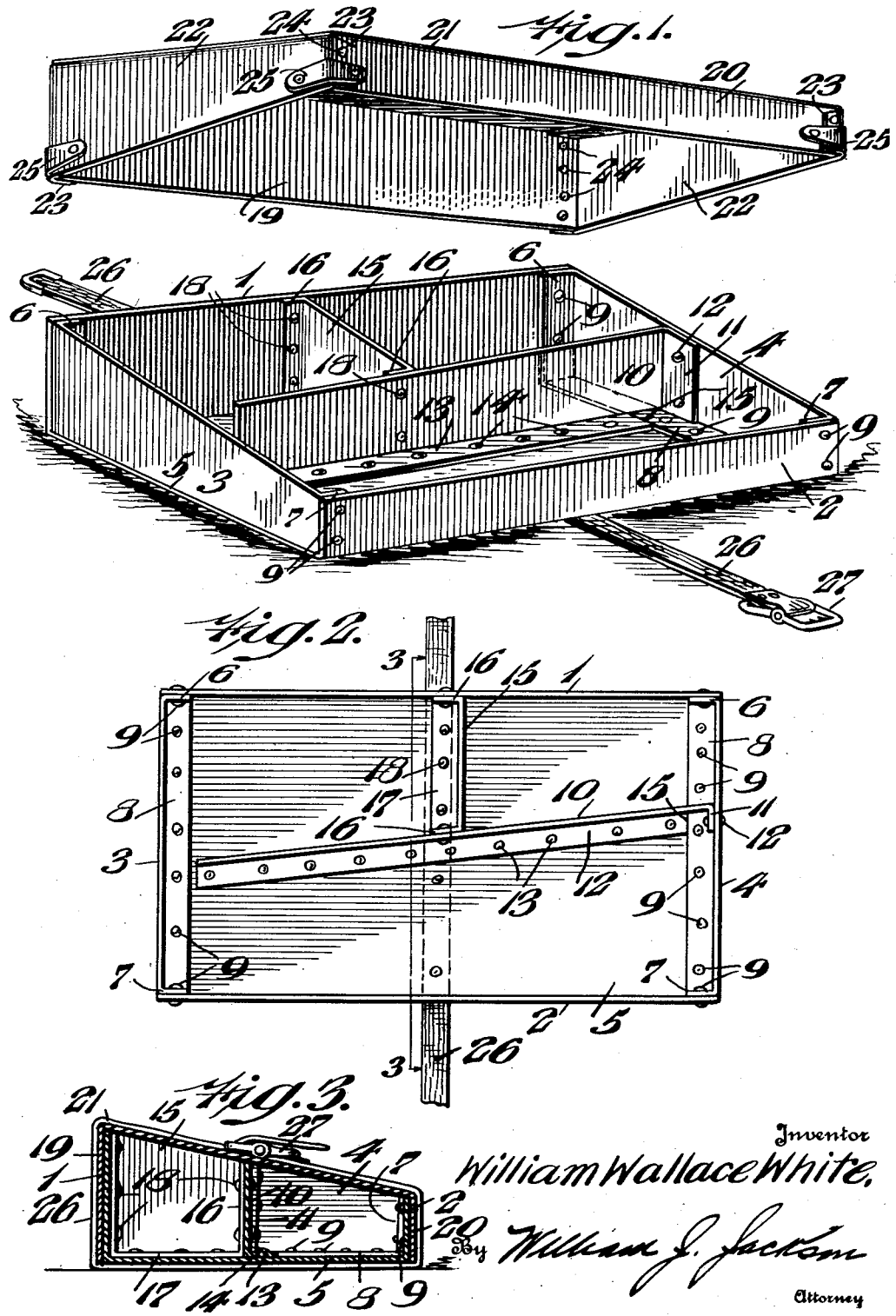

1,684,002

UNITED STATES PATENT OFFICE

WILLIAM WALLACE WHITE, OF KENNETT SQUARE, PENNSYLVANIA, ASSIGNOR TO STANDARD FIBRE COMPANY, OF KENNETT SQUARE, PENNSYLVANIA, A CORPORATION OF DELAWARE.

TOOL BOX FOR AUTOMOBILES.

Application filed June 8, 1926. Serial No. 114,395.

This invention stated in its broadest terms relates to automobile accessories and has more especial relation to a portable tool box capable of being arranged beneath the folding seat of a motor vehicle.

The leading object of the present invention may be said to reside in the provision or a portable tool box for use in connection with automobiles and similar vehicles which may be arranged in a convenient position beneath a folding seat thereof for access by the operator or driver of the car while being inconspicuous and unobstructive as far as the space within the car is concerned, to the end that it may occupy space unavailable for other purposes and may not interfere with the foot room of the operator of the car in controlling the pedals and other devices incidental to the operation of the mechanism.

A further object is to provide a tool box of the character stated which, being portable, may be shifted from beneath one folding seat of a vehicle to another when desired or may be temporarily removed should occasion require it.

A further object of the present invention is to provide a tool box body made up of sheets of fibre riveted together and to provide a cover of the same material therefor, the cover having telescopic relation with the box body.

A still further object of the present invention resides in the provision of a neat, strong and durable tool box of the character stated, many of the parts of which may be formed from scrap or waste pieces of fibre, thus providing an efficient automobile accessory at minimum cost.

Other and further objects reside in the provision of certain novel arrangements, construction, and combination of parts for attaining the results recited in the aforesaid objects.

Still other and further objects not at this time recited will hereinafter appear.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view looking from the rear and in perspective of a tool box embodying the invention, the cover being shown partially removed.

Fig. 2 is a top or plan view of the box body; and

Fig. 3, is a view in cross-section of the box with cover in place and strapped to position, the view being taken upon a line eqivalent to the line 3—3 upon Fig. 2.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Before taking up a detailed description of the tool box per se it is believed that it is in order and proper to state that the folding seat of a motor vehicle (individual seat) is so constructed that when in normal or seating position the seat proper inclines from the forward portion thereof rearwardly. Therefore, any receptacle thereunder must necessarily have its upper edges likewise incline, otherwise the folding seat cannot assume a working position. I have discovered that by making a portable tool box for storage beneath a folding seat of a motor vehicle I can use fibre waste to a great extent because of the number of peculiar shapes and sizes of strips of fibre required. Fibre being especially strong and durable makes for an efficient article of the character under consideration and because waste may be employed in certain of the structural parts a commodity is provided at minimum expense, the advantage of which is obvious.

Referring now to the drawings in detail, the reference numeral 1 designates the front vertical wall of the tool box, 2 the rear vertical wall, and 3 and 4 the end vertical walls thereof, it being thus understood that the highest wall or wall 1 faces the front of the machine. This is necessary so that the folding seat may be properly folded to seating position. The reference numeral 5 designates the base bottom and in practice it is preferred to make the front, rear and bottom integral as shown in the drawings, although this is not necessary in so far as the invention is concerned. The end pieces 3 and 4 are each flanged fore and aft and at their bases as at 6, 7, and 8; are fitted against the inner faces of walls 1—2 and base 5; and secured thereto preferably by rivets 9 although equivalent attachment may be practiced. The end walls, of course, have their top edges inclining from the front to the rear wall. Because of its small size and odd shape, scrap or waste may be employed and the same is true of the partitions about to be described, as well as certain parts of the cover to be described later. Extending longitudinally of the box proper but at angle with respect to both the front and rear walls thereof is a vertical partition 10, one end of which is flanged at 11, abuts against end wall 4, and is secured thereto by rivets 12; the opposite end terminating short of end wall 3. The bottom of partition is flanged at 13 and is secured to the base bottom by rivets 14 or equivalent means. At that place where the flanges 13 and 8 meet, see Fig. 1, it is the practice to cut away flange 13 as at 15 so that the two flanges may be fitted together to preserve an equal plane. For practical purposes it is desired that flange 13 face the rear of the box. The upper edge of partition 10 necessarily slants in a direction from wall 4 toward wall 3. Arranged transversely of the box is a short partition 15 flanged at each end at 16 and flanged at its bottom as at 17. The flanged parts 16 abut against the box front wall 1 and the partition 10 and the flanged part 17 abuts against the box bottom, rivets 18 or equivalent fastening means being employed. The upper edge of partition 15 inclines from the front wall 1 toward partition 10. The two forward compartments thus formed are available for various tools and accessories required by motorists and the rear or elongated compartment may be employed for storage of a conventional foot pump, the space between the end of partition 10 and end wall 3 serving to accommodate the foot or base of the pump.

Arranged to fit over the receptacle part just described in telescopic fashion, is a cover comprised of a front piece 19, rear piece 20, and top piece 21 of integral structure, and end pieces 22. The end pieces 22 are each flanged at 23 fore and aft and engage around the front and rear pieces 19—20 to provide a smooth, inside finish for a snug fit of the cover over the box body part. The parts are riveted together at 24 and angle pieces 25 are employed for reinforcing the cover corners to assure retention of the cover shape. This is necessary because if the cover becomes mis-shapen a snug fit with the box body cannot be had. When the cover is fitted over the box body a strap 26 having a fastening attachment 27 is employed to prevent accidential detachment of cover.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is suspectible of modification in various particulars without departing from the spirit or scope of the invention or sacrificing any of its advantages.

What I claim is:

1. In a tool box, in combination a receptacle portion consisting of a bottom and front, rear and side walls the front wall being appreciably higher than the rear wall and the top edges of the side walls inclining from the front to said rear wall, a longitudinally extended, vertical partition arranged at an inclination with respect to the said front and rear walls fixed at one end to an end wall of the box and having the other end thereof spaced from the opposite end wall of the box, means for securing said parts together, and a cover for said receptacle portion.

2. In a tool box, in combination a receptacle portion consisting of a bottom and front, rear and side walls the front wall being appreciably higher than the rear wall and the top edges of the side walls inclining from the front to said rear wall, a longitudinally extended, vertical partition arranged at an inclination with respect to the said front and rear walls, a transverse partition arranged between said front wall and said longitudinal partition, all of said walls and partitions being of relatively yielding material, said side pieces and said partitions being flanged, both horizontally and vertically considered, and means passing through said flanges for securing rigidity of the receptacle considered both horizontally and vertically.

In testimony whereof I have hereunto signed my name.

WILLIAM WALLACE WHITE.